US012275025B2

(12) United States Patent
Kim et al.

(10) Patent No.: US 12,275,025 B2
(45) Date of Patent: Apr. 15, 2025

(54) CONTENT CONTAINER

(71) Applicant: YONWOO CO., LTD., Incheon (KR)

(72) Inventors: Yu Seob Kim, Incheon (KR); Min Goo Kim, Incheon (KR); Ah Young Kim, Incheon (KR); Soo Hwan Kim, Incheon (KR)

(73) Assignee: YONWOO CO., LTD., Incheon (KR)

( * ) Notice: Subject to any disclaimer, the term of this patent is extended or adjusted under 35 U.S.C. 154(b) by 204 days.

(21) Appl. No.: 18/011,449

(22) PCT Filed: Mar. 22, 2021

(86) PCT No.: PCT/KR2021/003518
§ 371 (c)(1),
(2) Date: Dec. 19, 2022

(87) PCT Pub. No.: WO2021/261711
PCT Pub. Date: Dec. 30, 2021

(65) Prior Publication Data

US 2023/0302474 A1 Sep. 28, 2023

(30) Foreign Application Priority Data

Jun. 23, 2020 (KR) ........................ 10-2020-0076794

(51) Int. Cl.
*B05B 11/00* (2023.01)
*B05B 11/02* (2023.01)
(Continued)

(52) U.S. Cl.
CPC ........ *B05B 11/028* (2023.01); *B05B 11/0038* (2018.08); *B05B 11/048* (2013.01);
(Continued)

(58) Field of Classification Search
CPC ... B05B 11/02; B05B 11/0038; B05B 11/048; B05B 11/1004; B05B 11/1052;
(Continued)

(56) References Cited

U.S. PATENT DOCUMENTS

| | | | | |
|---|---|---|---|---|
| 4,020,978 A * | 5/1977 | Szczepanski | B65D 35/28 | 222/209 |
| 4,087,023 A * | 5/1978 | Szczepanski | B05B 11/046 | 239/327 |

(Continued)

FOREIGN PATENT DOCUMENTS

| | | |
|---|---|---|
| JP | H10-179739 A | 7/1998 |
| JP | 2007-168864 A | 7/2007 |

(Continued)

*Primary Examiner* — Vishal Pancholi
(74) *Attorney, Agent, or Firm* — Bridgeway IP Law Group, PLLC; Sang Ho Lee; Hyun Woo Shin

(57) ABSTRACT

Provided is a content container including: an inner container in which contents are stored; an outer container into which the inner container is accommodated; a pump part coupled to an upper end portion of the inner container to discharge the contents; and a nozzle part coupled to upper side of the pump part to discharge the contents transferred from the pump part to outside, wherein when an outer surface of the outer container is pressed, the inner container ascends within the outer container and the pump part is pressed by the nozzle part so that the contents are discharged through the nozzle part.

11 Claims, 6 Drawing Sheets

1000

(51) Int. Cl.
*B05B 11/04* (2006.01)
*B05B 11/10* (2023.01)

(52) U.S. Cl.
CPC ...... *B05B 11/1004* (2023.01); *B05B 11/1052* (2023.01); *B05B 11/1059* (2023.01); *B05B 11/1047* (2023.01)

(58) Field of Classification Search
CPC ............. B05B 11/1059; B05B 11/1047; B05B 11/1023; B05B 11/0054; B05B 11/1028; B05B 11/1043; A45D 34/00; A45D 40/00
See application file for complete search history.

(56) References Cited

U.S. PATENT DOCUMENTS

| | | | | |
|---|---|---|---|---|
| 6,871,798 | B2 * | 3/2005 | Mathiez | B05B 11/0038 239/378 |
| 2005/0224525 | A1 | 10/2005 | Davies | |
| 2017/0326578 | A1 * | 11/2017 | Kang | B05B 11/1033 |

FOREIGN PATENT DOCUMENTS

| | | | | |
|---|---|---|---|---|
| JP | 2010-235201 | A | | 10/2010 |
| KR | 20-0379593 | Y1 | | 3/2005 |
| KR | 20-2011-0002701 | U | | 3/2011 |
| KR | 10-1252115 | B1 | | 4/2013 |
| KR | 10-1468387 | B1 | | 12/2014 |
| KR | 10-2015-0019242 | A | | 2/2015 |
| KR | 20150019242 | A | * | 2/2015 |
| KR | 20-0480199 | Y1 | | 4/2016 |
| WO | 94/15855 | A1 | | 7/1994 |

* cited by examiner

CONTENT CONTAINER

TECHNICAL FIELD

The present invention relates to a content container, and more specifically, to a content container capable of discharging contents by operating a pump in a simple manner of pressing the outer surface of an outer container.

BACKGROUND ART

Recently, as interest in beauty and health increases, the cases that users carry and use containers containing contents, such as cosmetics, medicines, and the like, are increasing. Accordingly, the demand for containers having convenience in use as well as simply storing contents is increasing.

In general, containers containing contents, such as cosmetics, medicines, and the like, are formed in a soft tube type to discharge the contents when a user directly presses the outer surface of the container, or is formed in a pump type, of which the upper side is coupled with a pump, to discharge the contents when a user presses a nozzle part to operate the pump.

The conventional tube type container is convenient in use since discharges the contents when the user simply presses the outer surface of the container. However, the conventional tube type container has several disadvantages in that it is difficult to constantly adjust the discharge amount when discharging the contents, in that a small amount of the contents remaining in the container can be discharged only when the user applies lots of external force to the container, and in that it is difficult to discharge all of the contents remaining in the container.

In addition, the conventional pump type container can discharge a fixed amount of the contents. However, the conventional pump type container has several disadvantages in that it is difficult to form the nozzle part in various types since the nozzle part must have components for pressurization, in that the configuration of the pump type container is complicated and manufacturing costs increase if means for pressurization of the nozzle part are mounted, and in that it is inconvenient in use since the user must press only a specific portion of the container to discharge the contents.

Therefore, a content container capable of solving such disadvantages is required.

DISCLOSURE

Technical Problem

Accordingly, the present invention has been made in view of the above-mentioned problems occurring in the related art, and it is an object of the present invention to provide a content container capable of operating a pump by vertically moving contents in the container in a simple manner of pressing the outer surface of an outer container, thereby discharging the contents.

The aspects of the present invention are not limited to those mentioned above, and other aspects not mentioned herein will be clearly understood by those skilled in the art from the following description.

Technical Solution

According to an embodiment of the present invention, there is provided a content container including: an inner container in which contents are stored; an outer container into which the inner container is accommodated; a pump part coupled to an upper end portion of the inner container to discharge the contents; and a nozzle part coupled to upper side of the pump part to discharge the contents transferred from the pump part to outside, wherein when an outer surface of the outer container is pressed, the inner container ascends within the outer container and the pump part is pressed by the nozzle part so that the contents are discharged through the nozzle part.

Preferably, the outer container may include: at least one slit portion formed to penetrate the outer container upward from a lower end portion of the outer container by a predetermined length; and at least one pressing portion protruding inward from an inner surface of the outer container, wherein when the outer container is pressed, a lower end portion of the outer container may be compressed by the slit portion and the pressing portion may move inward so that a lower end portion of the inner container is pushed upward.

Moreover, preferably, the inner container may comprise a seating portion disposed at a lower end portion, having an inclined surface formed on at least one side thereof, and seated on the pressing portion when the inner container and the outer container are coupled to each other, wherein when the outer container is pressed, the pressing portion may move along the inclined surface to push the lower end portion of the inner container upward.

Furthermore, preferably, when pressure to the outer container is released, a shape of the outer container is restored, so that the inner container may lower inside the outer container.

Additionally, preferably, at least one guide protrusion may be formed on an outer surface of the inner container to protrude, and wherein the guide protrusion may be inserted into the slit portion to prevent rotation of the inner container, and guide ascending and descending of the inner container.

In addition, preferably, at least one locking slit may be formed on one side of the slit portion, wherein the guide protrusion may move into the locking slit to prevent ascending and descending of the inner container.

Moreover, preferably, a shoulder part in which the pump part is coupled may be detachably coupled to an upper end portion of the inner container, wherein a first edge in which extends downward from a circumference of an upper surface, and a second edge in which extends downward from an inner upper surface and arranges to be spaced apart from an inner side of the first edge may be formed on the nozzle part. The first edge may be coupled to the outer container, and at least a portion of the second edge may be inserted into the shoulder part to come into contact with an inner surface of the shoulder part.

Furthermore, preferably, a discharge portion may be formed on the nozzle part to discharge the contents to outside, wherein at least a portion of the discharge portion may extend downward from an inner upper surface of the nozzle part by a predetermined length, and the pump part may be coupled to a lower end portion of the discharge portion to be pressed by a lower end portion of the discharge portion when the inner container ascends.

Additionally, preferably, the inner container, the shoulder part and the pump part may be coupled to form an inner container assembly, and a sealing cap may be coupled to an upper side of the inner container assembly so as to be stored in safety, wherein the inner container and the outer container may be coupled to each other when the sealing cap is removed from the inner container assembly and the inner container of the inner container assembly is inserted into the outer container.

In addition, preferably, at least a portion of the outer container may be made of an elastic material.

Advantageous Effects

According to the present invention, the content container can increase convenience in use since discharging the contents just by an action of pressing the outer container.

Moreover, according to the present invention, since the inner container ascends and the pump part performs a pumping action when the outer container is pressed, there is no need to make the nozzle part in a button type and the like. Therefore, the content container according to the present invention can simplify the configuration of the nozzle part and form the nozzle part in various shapes if necessary.

Furthermore, the content container according to the present invention can be configured to prevent rotation of the inner container and to guide the ascending and descending of the inner container by only the guide protrusion formed on the inner container and inserted into the slit portion, thereby simplifying the configuration of the container and lowering manufacturing costs.

Additionally, the content container according to the present invention has the inner container assembly which is integrally coupled to the outer container in a detachable manner, so that a user can easily refill the contents by separating and replacing the inner container assembly when the contents are exhausted.

In addition, the content container according to the present invention can prevent ascending and descending of the inner container by moving the guide protrusion into the locking slit, thereby preventing the contents from being discharged unintentionally while being stored or carried.

DESCRIPTION OF DRAWINGS

Brief description of the drawings is provided for more sufficiently understanding the drawings cited in the detailed description of the invention.

MODE FOR INVENTION

Reference will be now made in detail to the preferred embodiments of the present invention with reference to the attached illustrative drawings. It should be noted that, in adding reference signs to the constituent elements in each of the drawings, the same constituent elements have the same reference signs even though they are illustrated in different figures. In addition, in the description of the present invention, when it is judged that detailed descriptions of known functions or structures may make the essential points vague, the detailed descriptions of the known functions or structures will be omitted. In addition, the embodiments of the present invention will be described below, but the technical spirit of the present invention is not limited or restricted thereto, and may be variously modified and implemented by a person skilled in the art. For the convenience of description, the up, down, left, and right directions are described based on the drawings, and the scope of the present invention is not limited by the corresponding directions.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included. In addition, in describing elements of the present invention, terms such as first, second A, B, (a), (b) and others may be used. Such terms are used only for purposes of distinguishing an element from other element, but do not limit the substance of the element, sequence or order.

Figure 1:
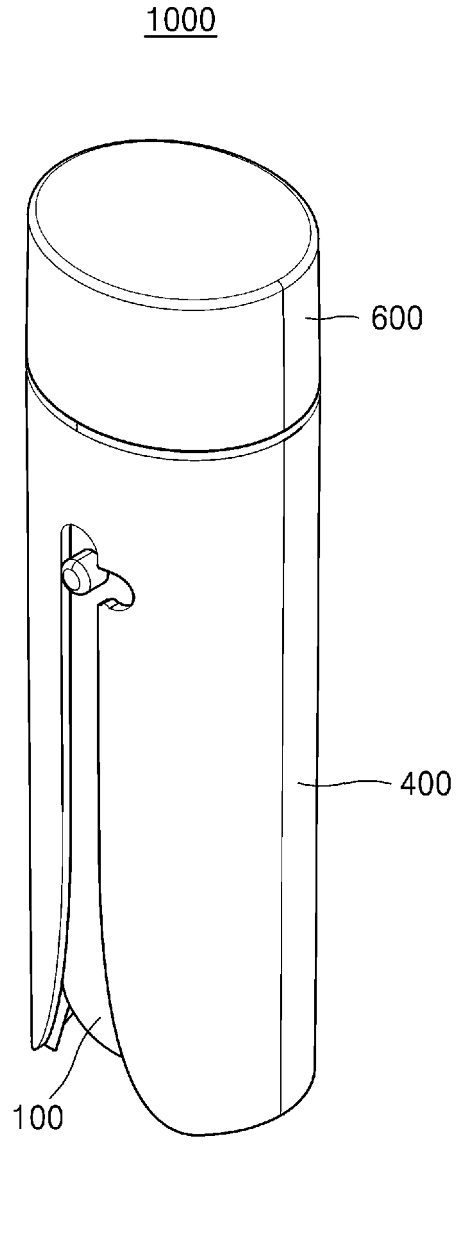
FIG. 1 is a perspective view of a content container according to an embodiment of the present invention.
Figure 2:
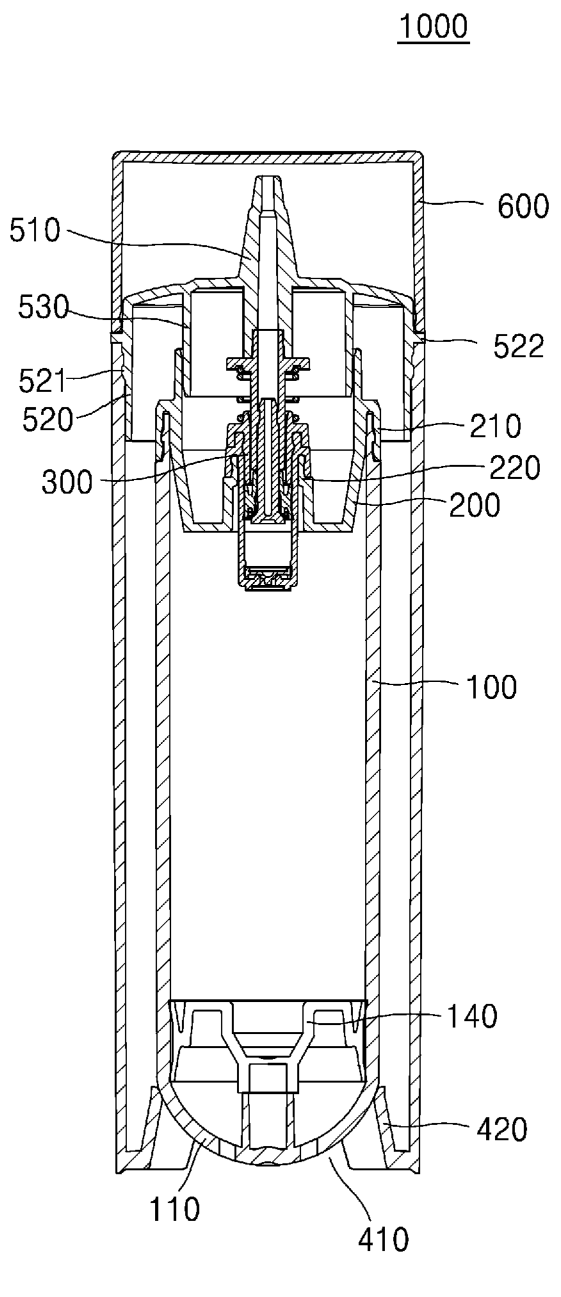
FIG. 2 is a cross-sectional view of the content container according to the embodiment of the present invention.
Figure 3:
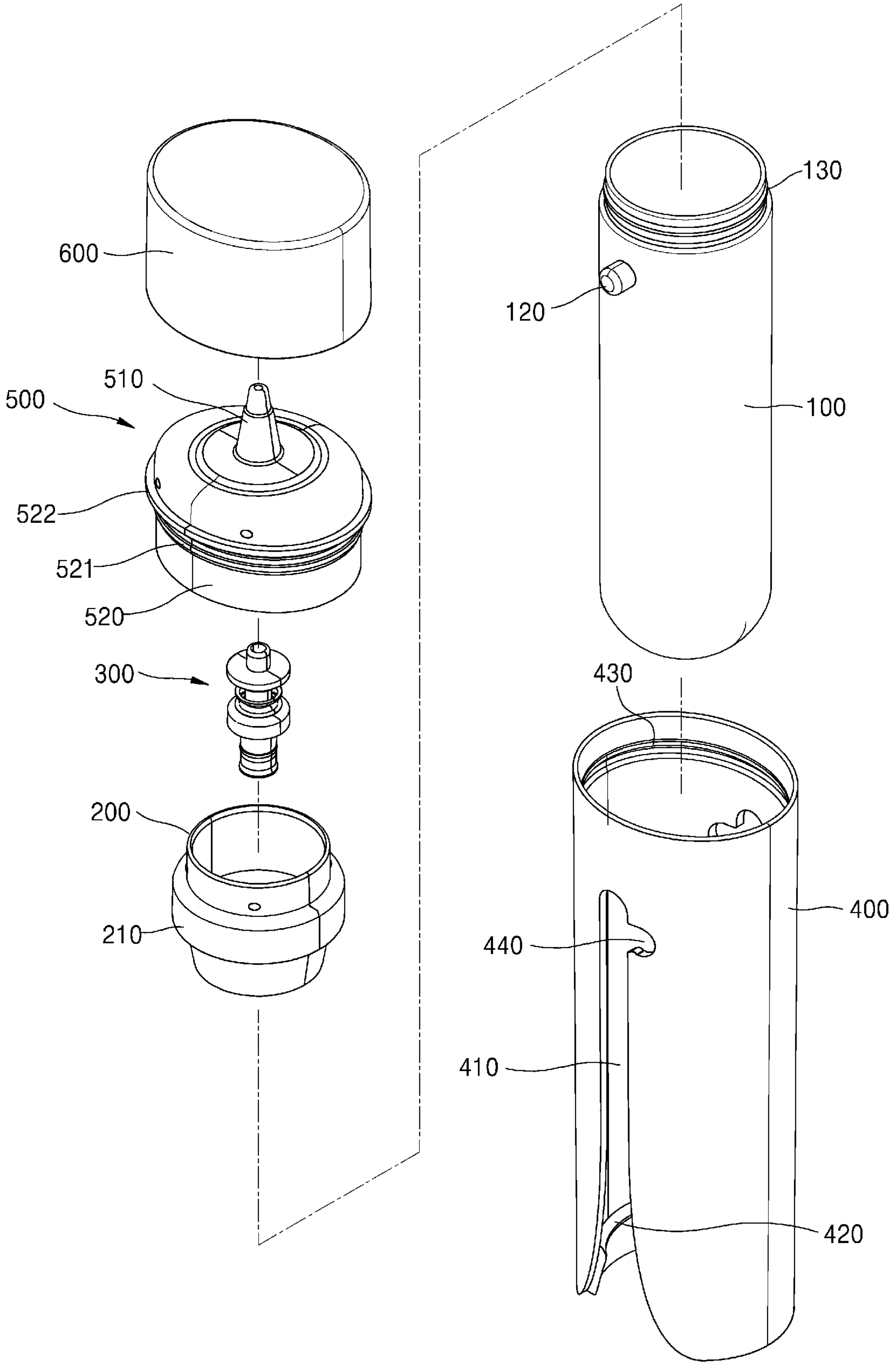
FIG. 3 is an exploded perspective view of the content container according to the embodiment of the present invention.

FIG. 1 is a perspective view of a content container according to an embodiment of the present invention, FIG. 2 is a cross-sectional view of the content container according to the embodiment of the present invention, and FIG. 3 is an exploded perspective view of the content container according to the embodiment of the present invention.

Referring to FIGS. 1 to 3, a contents container 1000 may include an inner container 100, a shoulder part 200, a pump part 300, an outer container 400, a nozzle part 500, and an outer cap 600.

The inner container 100 may accommodates contents therein, wherein the contents may be liquid or gel type cosmetics, medicines, quasi drugs, or the likes. However, the present invention is not limited thereto, and other formulations or other types of contents can be applied.

A seating portion 110 may be formed at the lower end portion of the inner container 100. The seating portion 110 may be seated on a pressing portion 420 of the outer container 400 as the inner container 100 is inserted into the outer container 400. When the lower portion of the outer container 400 is pressed, the pressing portion 420 of the outer container 400 may move along the outer surface of the seating portion 110 to push the seating portion 110 upward. The seating portion 110 may have an inclined surface formed on at least one side along the circumferential surface (or the outer circumferential surface). For example, the inclined surface may be formed to correspond to the pressing portion 420, and the pressing portion 420 may move along the inclined surface when the outer container 400 is pressed.

In an embodiment, the seating portion 110 may be generally formed in a dome shape having a gently curved slope, but the present invention is not limited thereto, and may have the seating portion of various shapes according to embodiments.

At least one guide protrusion 120 may be formed on the outer surface of the inner container 100 to protrude. The guide protrusion 120 may be inserted into a slit portion 410 of the outer container 400 when the inner container is coupled to the inside of the outer container 400, thereby preventing rotation of the inner container 100 and guiding lifting or lowering of the inner container 100. This will be described in more detail below.

A first coupling portion 130 may be formed on the upper end portion of the inner container 100 to be coupled with the shoulder part 200. The first coupling portion 130 may be, for example, a coupling protrusion, a coupling groove, a stepped jaw, a screw thread, or the like, but is not limited thereto, and may have one of various coupling structures.

A disk 140 may be provided inside of the inner container 100. The disk 140 can move upward according to discharge of the contents. That is, the disk 140 may push the contents upward as the contents stored in the inner container 100 are exhausted. More specifically, the disk 140 may maintain a state of getting in close contact with the inner wall of the inner container 100. Moreover, when the contents is discharged and the volume of the contents remaining in the inner container 100 is reduced, the disk 140 may move upward corresponding to the reduced volume.

The shoulder part 200 may be for coupling the pump part 300 to the inner container 100, and may be coupled to the upper end portion of the inner container 100 to at least partially seal the opened upper portion of the inner container 100. For example, when the shoulder part 200 is coupled to the inner container 100, at least a portion of the shoulder part 200 may be accommodated inside the inner container 100 through the open upper end portion of the inner container 100. In this instance, the outer surface of the portion accommodated in the inner container 100 can be in close contact with the inner surface of the upper end portion of the inner container 100. Accordingly, it is possible to prevent the contents from leaking through a gap in which the shoulder part 200 and the inner container 100 are coupled. According to an embodiment, a sealing protrusion and/or a groove for improving sealing force may be formed on at least one among the outer surface of the shoulder part 200 and the inner surface of the upper end of the inner container 100.

In an embodiment, the lower end portion of the shoulder part 200 may be configured to have an inner diameter smaller than other portions of the shoulder part, or may be configured to be reduced in inner diameter toward the lower end portion. Accordingly, the shoulder part 200 can be easily inserted and coupled into the inner container 100.

A second coupling portion 210 may be formed on the shoulder part 200 to protrude outward from the outer surface by a predetermined length and bend downward. Since the second coupling portion 210 is forcedly fitted and coupled to the first coupling portion 130 of the inner container 100, the shoulder part 200 may be detachably coupled to the inner container 100. Like the first coupling portion 130, the second coupling portion 210 may be, for example, a coupling protrusion, a coupling groove, a stepped jaw, a screw thread, or the like, but is not limited thereto, and may have one of various coupling structures.

The pump part 300 may be coupled to the inside of the shoulder part 200. The shoulder part 200 may have a pump coupling portion 220 formed therein. The pump coupling portion 220 may protrude upward from the inner bottom surface of the shoulder part 200, and may have a through hole (there is no reference numeral) formed therein to allow the lower portion of the pump part 300 (especially, the cylinder) to pass therethrough. For instance, as the cylinder of the pump part 300 is inserted into the through hole, a fixing portion (there is no reference numeral) formed on the sealing portion to seal a wing portion of the cylinder or the upper end of the cylinder is forcedly fit to the pump coupling portion 220, so that the pump part 300 can be coupled to the shoulder part 200.

The pump part 300 may be coupled to the upper end portion of the inner container 100 through the shoulder part 200 to discharge the contents contained in the inner container 100 to the nozzle part 500 by a pumping action. For example, the pump part 300 is coupled to the pump coupling portion 220 of the shoulder part 200 so that at least a portion of the pump part 300 may be configured to be accommodated inside the inner container 100. The pump part 300 may have a fixing part formed on at least one side to correspond to the pump coupling portion 220 so as to be coupled to the pump coupling portion 220.

The pump part 300 may include: a cylinder having an inlet communicating with the inside of the inner container 100; a seal cap disposed on the inner wall of the cylinder; a sealing portion coupled to the circumference of the upper end of the cylinder to suppress the rise of the seal cap; a piston rod having an inlet formed at an end to be opened and closed by the seal cap and connected to a discharge portion 510 of the nozzle part 500; a stem coupled to the piston rod to be elevated integrally with the piston rod and fit to the lower end portion of the discharge portion 510; and an elastic portion for providing elasticity from the sealing portion toward the nozzle part 500. However, the configuration of the pump part 300 is just an example, and the pump part 300 may have one of various configurations according to embodiments.

In an embodiment, the shoulder part 200 and the pump part 300 may be coupled to the upper end portion of the inner container 100, thereby forming an inner container assembly 100, 200 and 300. As described in detail hereinafter, the inner container assembly 100, 200 and 300 may be combined with or separated from the outer container 400 so that the user can easily refill the contents.

The outer container 400 may include a slit portion 410, a pressing portion 420, a third coupling portion 430, and a locking slit 440, and the inner container 100 is inserted into the outer container 400.

The slit portion 410 may be formed to penetrate the outer container 400 upward from the lower end portion of the outer container to a predetermined length. An elastic restoring force is generated in the outer container 400 by the slit portion 410, so that the lower end of the outer container 400 may be compressed when the outer container 400 is pressed, and the outer container 400 may be restored to its original shape when the outer container 400 is released. In this instance, at least a portion of the outer container 400 is made of an elastic material to facilitate pressurization and restoration of the outer container.

In an embodiment, the lower portion of the slit portion 410 may be formed such that the width thereof becomes downward wider. That is, for example, the slit portion 410 may be formed to have the same width up to one region extending downward from the upper end thereof, and to be widened downward from the one region. As a result, the lower end portion of the outer container 400 may be compressed more effectively, so that the pressing portion 420 can more effectively push the inner container 100 upward.

The guide protrusion 120 of the inner container 100 may be inserted into the slit portion 410. In particular, the guide protrusion 120 may be inserted into the upper slit portion 410 having the uniform width, so that the inner container 100 may be prevented from rotating inside the outer container 400.

In an embodiment, a pair of slit portions 410 may be respectively formed on opposite side surfaces of the outer container 400. However, the present invention is not limited thereto, and a plurality of slit portions 410 may be formed on opposite side surfaces of the outer container 400. In this instance, the guide protrusions 120 may also be formed in the number corresponding to the number of the slit portions 410.

At least one pressing portion 420 may protrude inward from the inner surface of the lower end of the outer container 400. The pressing portion 420 may be formed along the inner surface between the slit portions 410, and at least a portion of the seating portion 110 of the inner container 100 may be seated on the upper surface thereof. Therefore, when the outer container 400 is pressed, the lower end portion of the outer container 400 may be compressed, and the pressing portion 420 may move inward to press the inclined surface of the seating portion 110, so that the inner container 100 may ascend within the outer container 400.

In an embodiment, a guide portion (not shown) may be formed at an end portion of the pressing portion 420. The guide portion may be formed to extend upward or downward from the end portion of the pressing portion 420, and may include a guide surface corresponding to the shape of the seating portion 110 or the inclined surface of the seating portion 110. The guide surface may get in close contact with the seating portion 110 to surround at least a portion of the seating portion 110.

The third coupling portion 430 is a place where the nozzle part 500 is coupled, and may be formed on the inner surface of the upper end of the outer container 400. For example, the third coupling portion 430 may be formed in a groove or protrusion shape to be coupled to a fourth coupling portion 521 of the nozzle part 500. In this instance, the fourth coupling portion 521 of the nozzle part 500 may have a groove or protrusion corresponding to that of the third coupling portion 430 to be coupled to each other. However, the present invention is not limited thereto, and various coupling methods such as a screw thread may be applied.

The locking slit 440 may prevent the inner container 100 from ascending. At least one locking slit 440 may be formed at one side of the slit portion 410 to be continued with the slit portion 410. The locking slit 440 may be formed at the same height as the guide protrusion 120 of the inner container 100 in a state in which the outer container 400 is not pressed. As described below, in a case in which the content container 1000 is stored and carried, the guide protrusion 120 inserted into the slit portion 410 may be moved to the inside of the locking slit 440, thereby preventing the inner container 100 from ascending.

The nozzle part 500 may be coupled to the upper side of the pump part 300 to discharge the contents transferred from the pump part 300 to the outside, and may include a discharge portion 510, a first edge 520, and a second edge 530.

The discharge portion 510 may be formed in a region of the nozzle part 500 to have a discharge hole penetrating the inside thereof, and may be connected to the stem of the pump part 300 to discharge the contents transferred from the pump part 300 to the outside. In an embodiment, at least a portion of the discharge portion 510 may extend downward from an inner upper surface of the nozzle part 500 by a predetermined length. For example, a portion including the upper end portion of the discharge portion 510 may protrude outward from the upper surface of the nozzle part 500, and a portion including the lower end portion may extend downward from the inner upper surface of the nozzle part 500 by a predetermined length. However, the shape of the discharge portion 510 is not limited thereto, and the discharge portion 510 may be formed in such a way that only the discharge hole is exposed to the upper surface of the nozzle part 500 and the remaining portion is formed inside the nozzle part 500. The upper end portion of the pump part 300 (that is, the upper end portion of the stem) may be coupled to the lower end portion of the discharge portion 510 so that the upper end portion of the pump part 300 may be pressed by the discharge portion 510 when the inner container 100 ascends, thereby performing pumping.

The first edge 520 may extend downward from the circumference of the upper surface of the nozzle part 500 by a predetermined length to be coupled to the outer container 400. For this, the fourth coupling portion 521 may be formed on the outer surface of the first edge 520. As the first edge 520 is inserted into the inner side through the opened upper end portion of the outer container 400, the fourth coupling portion 521 may be coupled to the third coupling portion 430 formed on the inner surface of the outer container 400, so that the nozzle part 500 may be coupled to the outer container 400.

In an embodiment, a fixing protrusion (there is no reference numeral) for detachably coupling the outer cap 600 may be further formed on the outer surface of the upper end of the first edge 520.

A seating jaw 522 may protrude on the upper side of the fourth coupling portion 521 of the first edge 520 along the circumference of the first edge 520. When the nozzle part 500 and the outer container 400 are coupled to each other, the bottom surface of the seating jaw 522 may be seated on the upper end surface of the outer container 400.

The second edge 530 may extend downward from the inner upper surface of the nozzle part 500 by a predetermined length and may be formed to be spaced apart from the inside of the first edge 520. At least a portion of the second edge 530 may be inserted into the shoulder part 200 to come into contact with the inner surface of the shoulder part 200, thereby fixing the upper portion of the inner container assembly 100, 200 and 300. Accordingly, when the content container 1000 is assembled, the inner container 100 may be prevented from shaking inside the outer container 400. Moreover, when the inner container 100 ascends or descends, the second edge 530 and the guide protrusion 120 can guide the ascending or descending of the inner container 100 in the outer container.

The outer cap 600 may be detachably coupled to the outer surface of the nozzle part 500 or the outer container 400 to cover the nozzle part 500, thereby protecting the nozzle part 500 from contamination. In order to improve the coupling force of the outer cap 600, the inner surface of the outer cap 600 and the outer surface of the nozzle part 500 or the outer container 400 may be provided with a fixing protrusion, a locking protrusion, or the like, but they are just examples, and various structures used for the attachment and detachment of the outer cap 600 may be applied.

Figure 4:
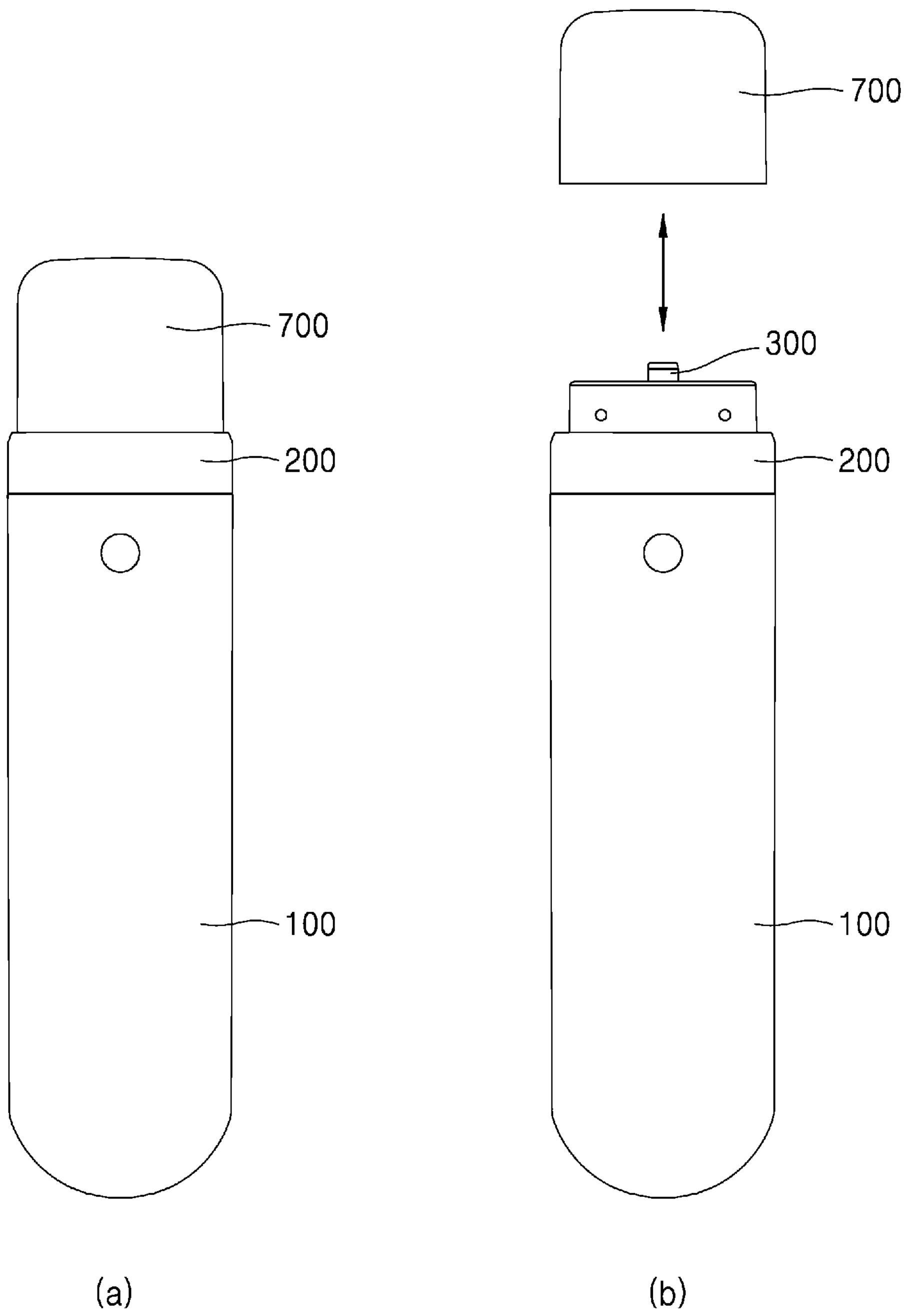
FIG. 4 illustrates an inner container assembly according to the embodiment of the present invention.

FIG. 4 illustrates an inner container assembly and a sealing cap according to an embodiment of the present invention.

Referring to FIG. 4, the inner container assembly 100, 200 and 300 may be configured in such a way that a sealing cap 700 is coupled to the upper end of the inner container assembly 100, 200 and 300 so that a user can store and carry it.

Accordingly, the user can quickly and conveniently refill the contents in a case in which the contents in the content container 1000 are exhausted since storing and/or carrying at least one extra inner container assembly 100, 200 and 300.

That is, the user can easily refill the contents by separating the inner container assembly from which the contents were exhausted from the content container 1000, removing the sealing cap 700 from a new inner container assembly 100, 200 and 300, and then combining the new inner container assembly 100, 200 and 300 with the outer container 400.

Figure 5:
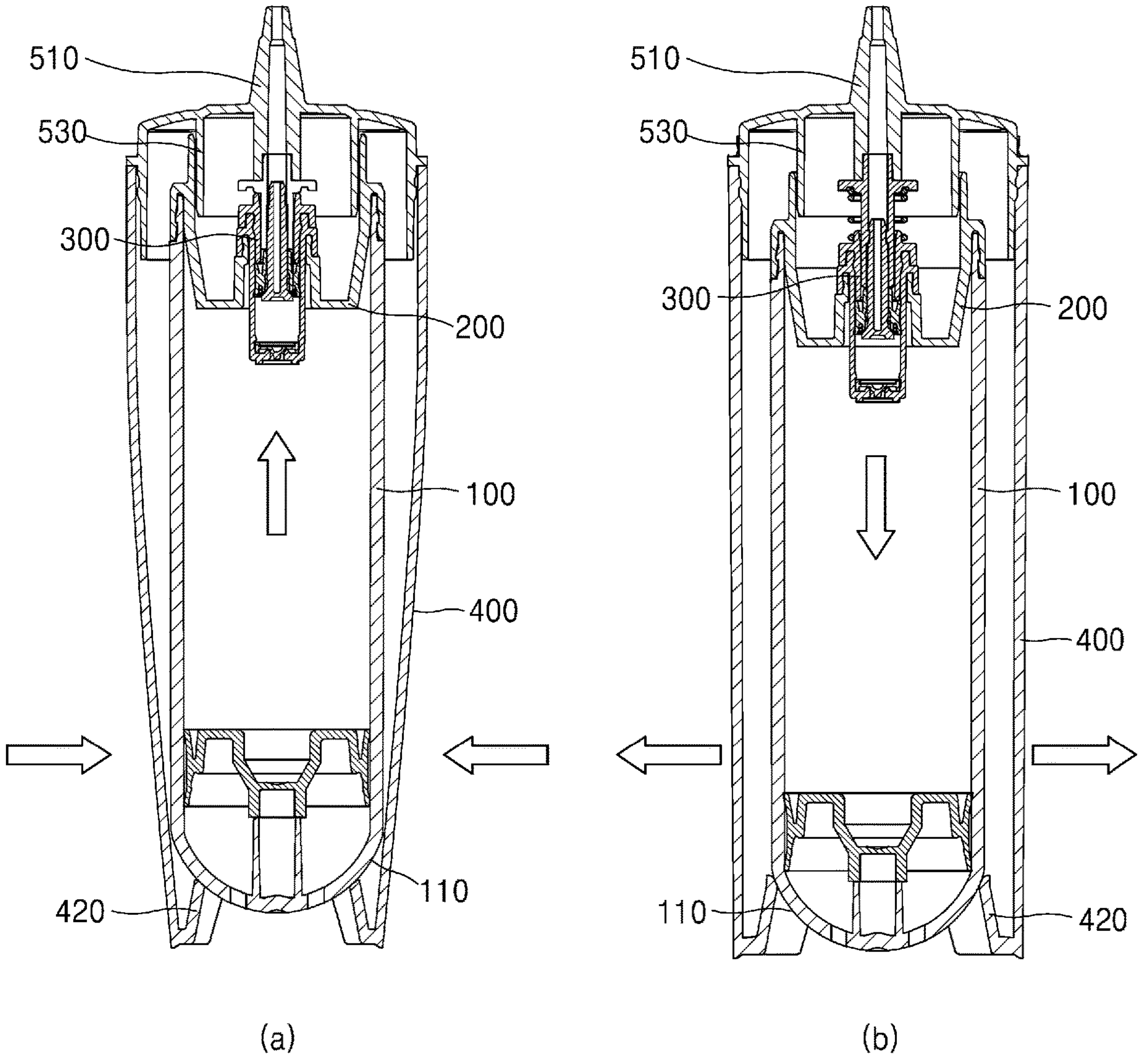
FIG. 5 illustrates an example in which the content container according to the embodiment of the present invention is used.
Figure 6:
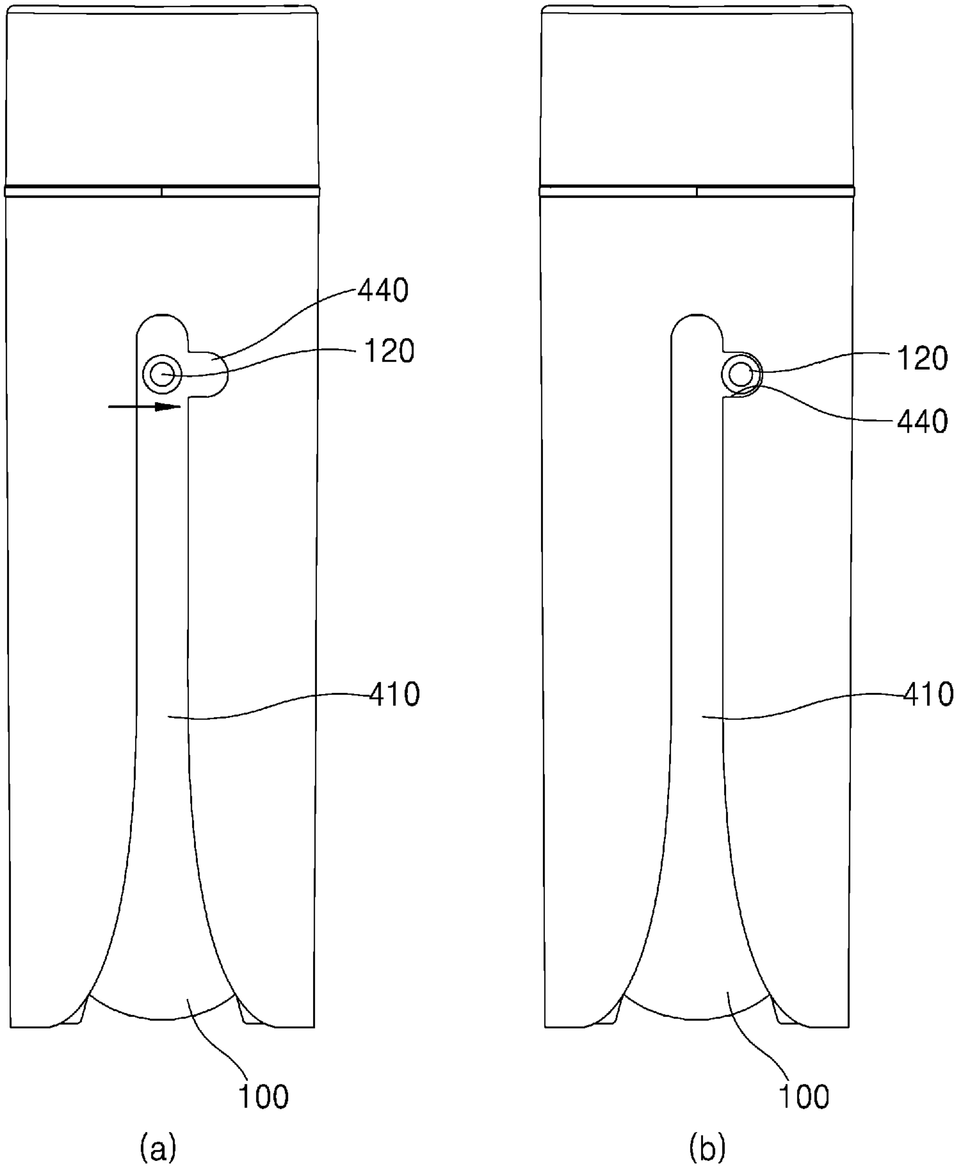
FIG. 6 illustrates another example in which the content container according to the embodiment of the present invention is used.

FIGS. 5 and 6 illustrate examples in which the content container according to an embodiment of the present invention is used.

Referring to FIG. 5, the user may press the outer surface (especially, the lower portion) of the outer container 400 to elevate the inner container assembly 100, 200 and 300, thereby discharging the contents.

First, referring to FIG. 5(*a*), when the user presses the outer container 400, the lower end portion of the outer container 400 is compressed by the slit portion 410, and the pressing portion 420 moves inward. Accordingly, the pressing portion 420 presses the seating portion 110 and moves along the inclined surface of the seating portion 110, so that the lower end portion of the inner container 100 is pushed upward. Therefore, the inner container assembly 100, 200 and 300 ascend within the outer container 400. Meanwhile, when the inner container assembly 100, 200 and 300 ascends, the nozzle part 500 coupled to the outer container 400 maintains the fixed state, so that the upper end portion (namely, the stem) of the pump part 300 is pressed by the lower end portion of the discharge portion 510. Therethrough, internal pressure of the pump part 300 is increased so that the contents may be discharged through the discharge portion 510.

Continuously, referring to FIG. 5(*b*), the inner container 100, which has been raised when the pressure of the outer container 400 is released, may lower to its original position. That is, when the user releases the outer container 400, the lower end portion of the outer container 400, which has been compressed, may be restored to the original shape by the elastically restoring force. Accordingly, the pressing portion 420 moved inward is returned to the original position, and the lower end portion of the inner container 100 which has been pushed up lowers, so that the seating portion 110 is seated on the pressing portion 420 again. Accordingly, the internal pressure of the pump part 300 may be reduced while the pressure of the pump part 300 is released, and the contents may be sucked into the pump part 300 from the inner container 100.

Referring to FIG. 6, the user can push the guide protrusion 120 to one side to lock the content container 1000 such that the contents are not discharged.

For instance, when the guide protrusion 120 is pushed laterally in the state in which pressure to the outer container 400 is released, the inner container 100 may rotate to a predetermined angle in the direction of the locking slit 440. Therefore, the guide protrusion 120 can be positioned inside the locking slit 440 by being pushed. Since a vertical movement of the guide protrusion 120 is restricted inside the locking slit 440, ascending and descending of the inner container 100 may be prevented. Therefore, in a case in which the content container 1000 is not used, the user may locate the guide protrusion 120 inside the locking slit 440 to prevent discharge of the contents. Meanwhile, in order to discharge the contents, the user moves the guide protrusion 120 located inside the locking slit 440 to the inside of the slit portion 410. Then, the user can use the content container 1000 again.

As described above, optimal embodiments are disclosed in the drawings and in the specification. Although specific terms are used herein, they are only used for the purpose of describing the present invention, and are not used to limit the meaning thereof or to restrict the scope of the present invention set forth in the claims. Therefore, it will be understood by those skilled in the art that various modifications and equivalents are possible therefrom. Accordingly, the actual technical protection scope of the present invention must be determined by the spirit of the appended claims.

The invention claimed is:

1. A content container comprising:

an inner container configured to store contents therein;

an outer container accommodating the inner container therein;

a pump part coupled to an upper end portion of the inner container and configured to discharge the contents; and a nozzle part coupled to an upper side of the pump part discharging the contents transferred from the pump part to an outside of the content container, wherein when an outer surface of the outer container is pressed, the inner container ascends within the outer container, the pump part is pressed by the nozzle part, and the contents are discharged through the nozzle part, wherein the outer container comprises;

at least one slit portion disposed to penetrate the outer container upward from a lower end portion of the outer container by a predetermined length; and at least one pressing portion protruding inward from an inner surface of the outer container, and wherein when the outer container is pressed, the lower end portion of the outer container is compressed by the at least one slit portion, the at least one pressing portion moves inward, and a lower end portion of the inner container is pushed upward.

2. The content container according to claim 1, wherein the inner container comprises:

a seating portion disposed at the lower end portion of the inner container, having an inclined surface disposed on at least one side thereof, and seated on the at least one pressing portion when the inner container and the outer container are coupled to each other, and wherein when the outer container is pressed, the at least one pressing portion moves along the inclined surface of the seating portion to push the lower end portion of the inner container upward.

3. The content container according to claim 1, wherein when pressure to the outer container is released, a shape of the outer container is restored, and the inner container is lowered inside the outer container.

4. The content container according to claim 1, wherein at least one guide protrusion is disposed on an outer surface of the inner container, and wherein the at least one guide protrusion is inserted into the at least one slit portion to prevent rotation of the inner container and to guide ascending and descending of the inner container.

5. The content container according to claim 4, wherein at least one locking slit is disposed on one side of the at least one slit portion, and wherein the at least one guide protrusion moves into the at least one locking slit to prevent the ascending and descending of the inner container.

6. The content container according to claim 1, further comprising a shoulder part in which the pump part is coupled, wherein the shoulder part is detachably coupled to the upper end portion of the inner container, wherein the nozzle part includes a first edge extending downward from a circumference of an upper surface of the nozzle part and a second edge extending downward from an inner upper surface of the nozzle part, and the second edge is arranged to be spaced apart from an inner side of the first edge, and wherein the first edge is coupled to the outer container, and at least a portion of the second edge is inserted into the shoulder part to come into contact with an inner surface of the shoulder part.

7. The content container according to claim 6, wherein the inner container, the shoulder part and the pump part are coupled to form an inner container assembly, and a sealing cap is coupled to an upper side of the inner container assembly, and wherein the inner container and the outer container are coupled to each other when the sealing cap is removed from the inner container assembly and the inner container of the inner container assembly is inserted into the outer container.

8. The content container according to claim 1, wherein a discharge portion is disposed on the nozzle part to discharge the contents to the outside, wherein at least a portion of the discharge portion extends downward from an inner upper surface of the nozzle part by a predetermined length, and wherein the pump part is coupled to a lower end portion of the discharge portion and is pressed by the lower end portion of the discharge portion when the inner container ascends.

9. The content container according to claim 1, wherein at least a portion of the outer container is made of an elastic material.

10. A content container comprising:

an inner container configured to store contents therein;

an outer container accommodating the inner container therein;

a pump part coupled to an upper end portion of the inner container and configured to discharge the contents;

a nozzle part coupled to an upper side of the pump part discharging the contents transferred from the pump part to an outside of the content container; and a shoulder part in which the pump part is coupled, wherein the shoulder part is detachably coupled to the upper end portion of the inner container, wherein when an outer surface of the outer container is pressed, the inner container ascends within the outer container, the pump part is pressed by the nozzle part, and the contents are discharged through the nozzle part, wherein the nozzle part includes a first edge extending downward from a circumference of an upper surface of the nozzle part and a second edge extending downward from an inner upper surface of the nozzle part, and the second edge is arranged to be spaced apart from an inner side of the first edge, and wherein the first edge is coupled to the outer container, and at least a portion of the second edge is inserted into the shoulder part to come into contact with an inner surface of the shoulder part.

11. The content container according to claim 10, wherein the inner container, the shoulder part and the pump part are coupled to form an inner container assembly, and a sealing cap is coupled to an upper side of the inner container assembly, and wherein the inner container and the outer container are coupled to each other when the sealing cap is removed from the inner container assembly and the inner container of the inner container assembly is inserted into the outer container.

* * * * *